United States Patent [19]

Eng et al.

[11] Patent Number: 4,947,389

[45] Date of Patent: Aug. 7, 1990

[54] MULTI-CHANNEL RING ARCHITECTURE FOR DISTRIBUTED NETWORKS

[75] Inventors: Kai Y. Eng, Shrewsbury Township, Monmouth County; Mark J. Karol, Fair Haven, both of N.J.

[73] Assignee: AT&T Bell Laboratories, Murray Hill, N.J.

[21] Appl. No.: 362,185

[22] Filed: Jun. 6, 1989

[51] Int. Cl.[5] .......................................... H04L 12/00
[52] U.S. Cl. .................................................. 370/85.12
[58] Field of Search ....................... 370/60, 85.5, 85.9, 370/85.12, 94.1

[56] References Cited

U.S. PATENT DOCUMENTS

| | | | |
|---|---|---|---|
| 4,434,463 | 2/1984 | Quinquis et al. | 364/200 |
| 4,602,365 | 7/1986 | White et al. | 370/89 |
| 4,736,465 | 4/1988 | Bobey et al. | 455/612 |
| 4,875,207 | 10/1989 | Van Twist et al. | 370/85.12 |

OTHER PUBLICATIONS

"Analysis of a Chordal Ring Network", *IEEE Trans. on Computers*, vol. C-30, No. 4, Apr. 1981, B. W. Arden et al., pp. 291-295.

"PHILAN: a Fiber-Optic Ring for Voice and Data", *IEEE Communications Magazine*, vol. 24, No. 12, Dec. 1986, J. R. Brandsma et al., pp. 16-22.

"Terabit Lightwave Networks: The Multihop Approach", *AT&T Technical Jnl.*, vol. 66, Issue 6, Nov./Dec. 1987, A. S. Acampora et al., pp. 21-34.

*Primary Examiner*—Douglas W. Olms
*Assistant Examiner*—Melvin Marcelo

[57] ABSTRACT

The present invention relates to a high speed, multihop, Local Area Network (LAN) comprising a communications medium for supporting a plurality of channels therealong and a plurality of Network Interface Units (NIUs) disposed along the medium in a predetermined sequence. Each channel of the communications medium comprises one or more point-to-point communication links, and each NIU is arranged to transmit to, or receive from, at least two other NIUs using point-to-point links from a separate subset of the multiple channels. Several of the NIUs are also arranged to transmit to, or receive from, additional NIUs on the network using (i) point-to-point links from a separate subset of the channels and, (ii) a non-linear connection pattern. Each channel can be used to establish point-to-point links between several pairs of NIUs in nonoverlapping sections of the sequence of NIUs. Communications between two NIUs is accomplished either directly, by a point-to-point link interconnecting the two NIUs, or by hopping the packet through a small number of intermediate NIUS.

9 Claims, 9 Drawing Sheets

MULTI-CHANNEL RING ARCHITECTURE FOR DISTRIBUTED NETWORKS

TECHNICAL FIELD

This invention relates to multihop Local Area Networks (LAN) and, more particularly, to ring type multihop LANs.

DESCRIPTION OF THE PRIOR ART

Ring type LANs are widely used and are more efficient than bus architectures in high traffic situations. In ring type LANs, a "token", or unique bit pattern, is passed around the ring serially from one Network Interface Unit (NIU) to the next. Upon receiving the token, if an NIU has data to transmit, it holds the token, transmits its data, and then passes the token to the next NIU on the ring. If an NIU has no data to transmit, it simply passes the token to the next NIU on the ring. Data packets are routed through the ring by being passed sequentially from one NIU to the next until reaching their destination NIU.

The above described architecture suffers from two inefficiencies. First, each NIU, in addition to introducing its own traffic onto the ring, must read each packet from the previous NIU on the ring and retransmit the packet to the next NIU on the ring, if necessary. Therefore, each packet must be read, processed, and retransmitted by every NIU on the ring between the sending NIU and the receiving NIU. Consequently, much of the traffic processed by an NIU is retransmitted and is of no use to the NIU, wasting that NIUs time and processing power. Furthermore, an NIU must wait for the token to be passed to it before it can transmit any data, resulting in wasted network bandwidth. Finally, if an NIU has a large amount of data to transmit, it captures the token for a long time and deprives other NIUs from using the network.

U.S. Pat. No. 4,602,365 issued to R. J. White et al. on Jul. 22, 1986 teaches a multiple channel token ring LAN which allows an NIU to utilize an alternate channel if one or more of the channels are busy, thus reducing the contention problem. However, the NIU must have multiplexing circuitry to utilize all of the channels to which it is connected, and since each of the channels is operated as a separate token passing ring, each suffers from the inefficiencies discussed above.

U.S. Pat. No. 4,434,463 issued to J. P. Quinquis et al. on Feb. 28, 1984 teaches a ring type network with an N channel communications medium used to interconnect up to $N(N-1)/2$ NIUs, each NIU being connected to a unique pair of channels. The resultant network requires fewer intermediate NIUs to process the data packets than did prior art ring type networks, but does so at the expense of requiring N channels to interconnect $N(N-1)/2$ NIUs. Furthermore, since each channel operates as a multiple user bus with up to $N-1$ NIUs connected to it, a contention management scheme must be implemented on each of the channels, possibly resulting in further inefficiencies.

Other arrangements, such as the network described in the article "Analysis of a Chordal Ring Network" by B. W. Arden and H. Lee in *IEEE Transactions on Computers*, Vol C-30, No. 4, Apr. 1981, at pp. 291-295, have attempted to overcome the inefficiencies of ring type networks by installing an additional link at each of the NIUs. In addition to communicating directly with the immediate next and previous NIUs in the sequence, each NIU is arranged to communicate directly with an additional NIU. This additional NIU is disposed along the medium at a fixed "chordal length" from the particular NIU in question, where the chordal length is defined as the number of NIUs disposed on the medium between the two NIUs, where this number is measured by moving along the ring in the direction that yields the smallest number. This third path represents an "express path" around several NIUs and eliminates the need to process the packet at every intermediate NIU. However, the average number of intermediate NIUs which must process the packet before it reaches its destination NIU is still proportional to the number of NIUs, making packet delay large for large networks.

The problem that remains, therefore, is to provide a ring type network that (1) allows every packet to reach its destination NIU within a small number of hops relative to the number of NIUs, (2) keeps the number of channels required on the medium small, (3) eliminates contention among the NIUs, and (4) allows the bandwidth of the medium to be utilized efficiently.

SUMMARY OF THE INVENTION

The foregoing problem in the prior art has been solved in accordance with various aspects of the present invention which relates to a ring type LAN comprising a plurality of NIUs which are serially interconnected in a "nonlinear" connection pattern using a multiple channel communications medium. More particularly, each channel of the multiple channel communications medium includes one or more point-to-point dedicated communication links, each in a different section of the ring, the links being arranged in a predetermined pattern between preselected NIUs of the LAN. Each link provides a direct transmission path from one NIU to one other NIU. If a link exists from a transmitting NIU to a receiving NIU, a packet may be directly transmitted by means of the link. If no link exists from the transmitting NIU to the receiving NIU, a packet is communicated by multihopping it serially through one or more intermediate NIUs until the packet reaches an NIU which can transmit it to the receiving NIU by means of one of the links. Each NIU transmits on at least one link and receives on at least one link, and some NIUs, designated "express" NIUs, transmit or receive data on an additional set of two or more links. The connection pattern for the express NIUs is "nonlinear" in that the number of NIUs disposed along the medium between an express NIU and each of the additional NIUs to which it transmits directly, or from which it receives directly, is different for at least one express NIU than it is for at least one other express NIU.

In another embodiment of the invention, the sequence in which the NIUs are disposed is such that each NIU is sequentially either adjacent to, or nearby, the other NIUs to which it transmits directly or from which it receives directly. This allows several dedicated links to be established on each channel of the medium and thus decreases the number of channels required on the medium.

Other and further aspects of the present invention will become apparent during the course of the following description and by reference to the accompanying drawings.

3

DETAILED DESCRIPTION

Figure 1:
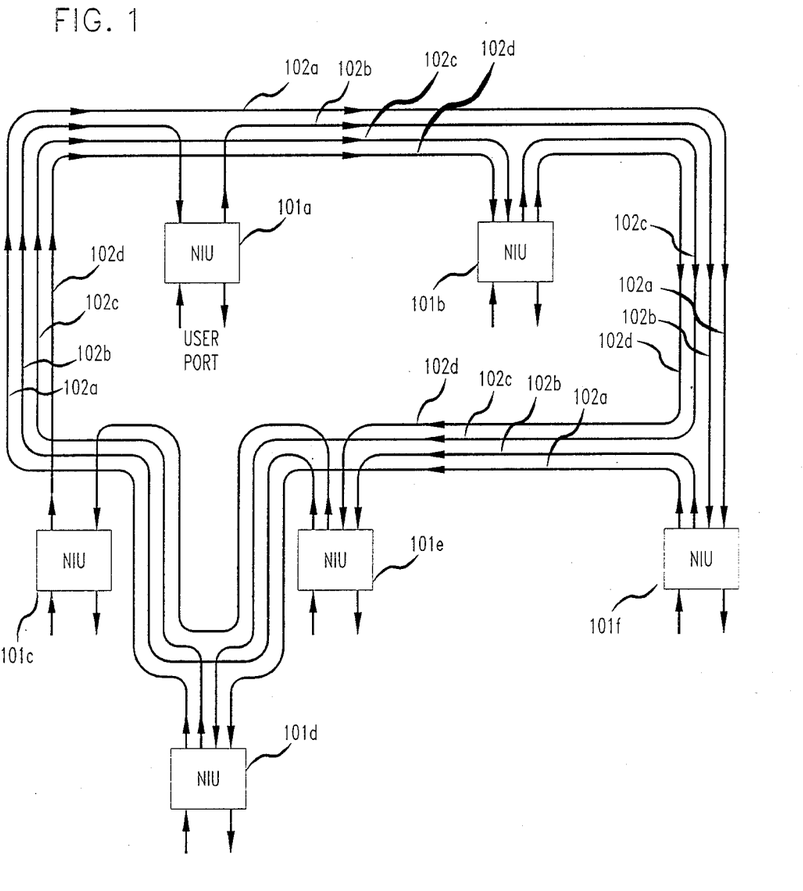
FIG. 1 illustrates a ring type network in which selected NIUs transmit directly to selected other NIUs and each channel establishes multiple dedicated links between preselected NIUs in accordance with the present invention.

FIG. 1 illustrates an exemplary multihop ring type Local Area Network (LAN) in accordance with the present invention in which six Network Interface Units (NIUs) 101a–101f are interconnected by means of a four channel communications medium, the channels of which may be separated from each other, for example, in space, time, or frequency. In accordance with one embodiment of the invention, each NIU is arranged to transmit directly to at least a first other NIU in the network and to receive directly from at least a second other NIU in the network. For example, NIU 101a is arranged to transmit directly to only NIU 101f, and to receive directly from only NIU 101e, both by means of channel 102b. In accordance with another embodiment of the invention, several of the NIUs are arranged not to transmit directly to other NIUs in the network. Rather, these NIUs communicate with each other by multihopping packets of data through various intermediate NIUs. For example, a packet to be transmitted from NIU 101a to NIU 101b would first be transmitted via channel 102b from NIU 101a to NIU 101f, then retransmitted by NIU 101f to NIU 101d via channel 102a, and finally retransmitted by NIU 101d by means of channel 102c to destination NIU 101b. An alternative path that would effect the same communication would be from NIU 101a to NIU 101f via channel 102b, from NIU 101f to NIU 101e via channel 102b, from NIU 101e to NIU 101c via channel 102d, and finally from NIU 101c to destination NIU 101b via channel 102d.

Every NIU in the network of FIG. 1 is capable of communicating with every other NIU in the network either directly or by means of one or more intermediate NIUs in the manner described above. Although the packet must go through several intermediate NIUs, many of the other NIUs connected in the network are bypassed, shortening packet delay time and saving processing power at each NIU. The connectivity pattern, which specifies the NIUs each particular NIU will be arranged to transmit directly to, can be chosen such that the number of required channels and the number of required intermediate NIUs by which a packet must be processed is kept small.

Figure 2:
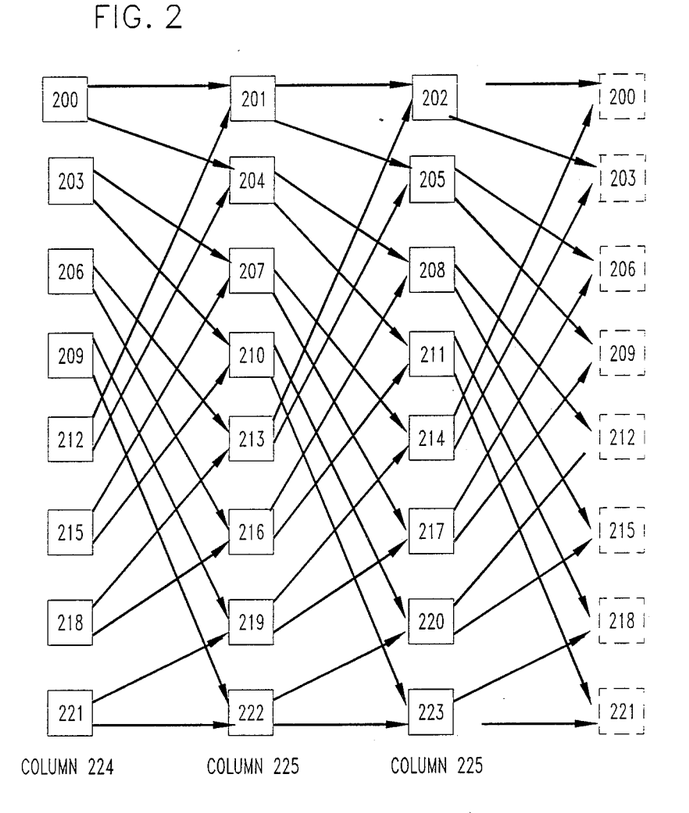
FIG. 2 illustrates a Shufflenet connectivity pattern of the prior art which can be rearranged and implemented using the ring type network of FIG. 1.

In another embodiment of the invention, a Shufflenet connectivity pattern of the prior art, an exemplary one of which is shown in FIG. 2, is implemented using the inventive LAN of FIG. 1. The Shufflenet connectivity pattern is desirable because the number of NIUs in the network is $kp^k$, where p and k are any positive integers, and data from an NIU in the network can reach any other NIU in at most $2k-1$ hops.

The general rule defining a complte Shufflenet connectivity pattern is as follows: First, a set of $kp^k$ NIUs, each with p receivers and p transmitters, is arranged into k columns, numbered 0 through $k-1$, of $p^k$ NIUs each. For example, FIG. 2 shows a set of $(3)(2^3)=24$ NIUs arranged into 3 columns of $2^3$ NIUs each. The rightmost column of FIG. 2, shown in dashed outline, is repetitive of first column 224 and is shown only for the purpose of constructing the logic diagram. Any connections to NIUs in the rightmost column of FIG. 2 would actually be made to the corresponding NIU in first column 224 of FIG. 2 when the network is implemented. The first NIU in column i of the Shufflenet, where $0 \leq i \leq k-1$, has each of its p transmitters connected to a separate one of the receivers of the first p NIUs in column $i+1 (\text{MOD } k)$. Thereafter, each consecutive NIU in column i is arranged to transmit directly to the next p NIUs in column $i+1(\text{MOD } k)$, until the $p^{(k-1)}$th NIU in column i is reached. Since each NIU in column i is arranged to transmit directly to p NIUs in column $i+1(\text{MOD } k)$, the $p^{(k-1)}$th NIU in column i will communicate with the last p NIUs in column $i+1(\text{MOD } k)$. The transmitters of each consecutive group of $p^{(k-1)}$ NIUs in column i are then configured identically to the first group. In column 224 of FIG. 2 for example, NIUs 200, 203, 206 and 209, all located in first column 224, each transmit directly to a separate pair of NIUs in second column 225. NIUs 212, 215, 218 and 221, the remainder of the NIUs from column 224, transmit to the same pairs of NIUs as NIUs 200, 203, 206 and 209, respectively. The MOD k addition is utilized in the above description in order to establish the connections from the last column of NIUs to the first column of NIUs.

Figure 3:
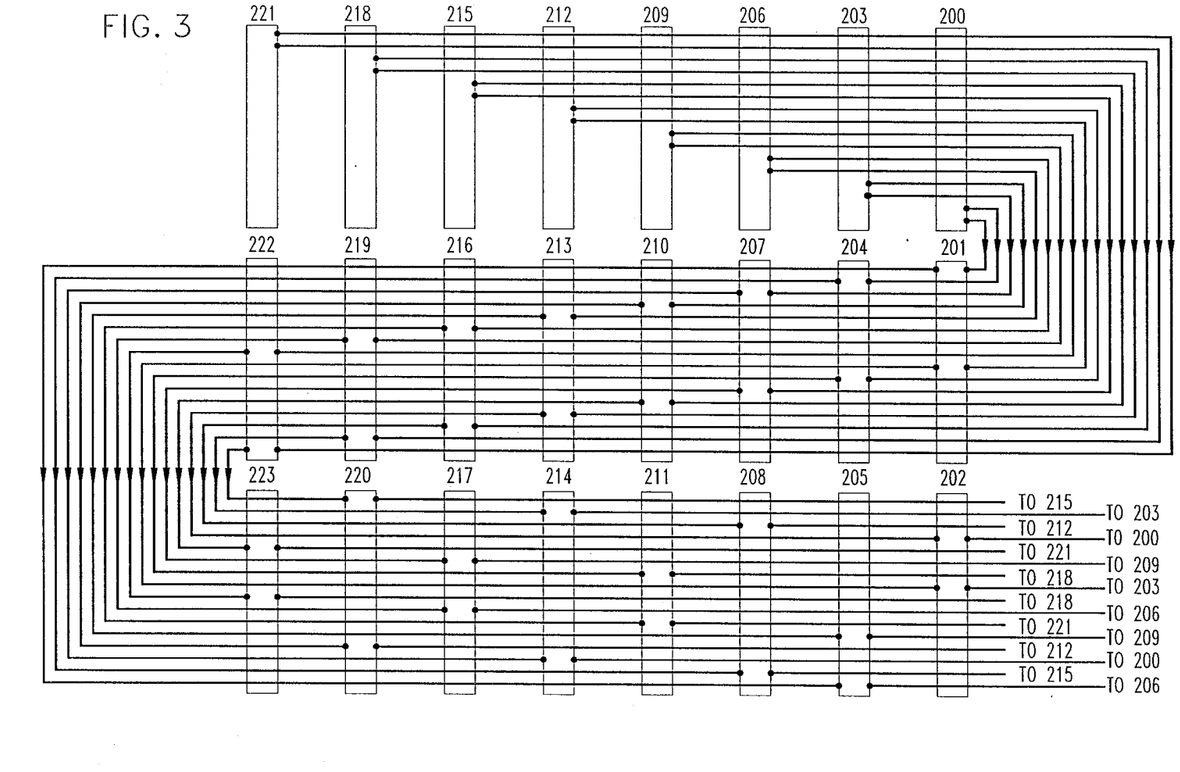
FIG. 3 illustrates a ring type implementation of the Shufflenet connectivity pattern of FIG. 2, showing the plurality of point-to-point links on each of the channels.

One technique for implementing the Shufflenet connectivity pattern on a multiple channel ring type network is to run the multiple channel medium up and down alternate columns of the Shufflenet pattern, and connect each of the NIUs to the appropriate channels. This implementation is shown in FIG. 3. Although this technique produces a ring type network with a small number of required intermediate hops, the number of channels required on the medium is at least $p^{(k+1)}$. This number of required channels can be reduced by installing the NIUs along the multiple channel medium in a special sequence such that each of the channels can be reused.

To determine the special sequence in which to dispose the NIUs, define a cycle of the Shufflenet as a set of k NIUs, one from each of the k columns of the Shufflenet, such that a transmitting NIU can receive its own transmitted data in exactly k hops by multihopping it through the set of k NIUs. For example, NIUs 206, 213, and 205 of FIG. 2 form a cycle since a packet transmitted from NIU 206 can reach itself by being hopped from NIU 206 to NIU 213, from NIU 213 to NIU 205 and from NIU 205 to NIU 206.

Figure 4:
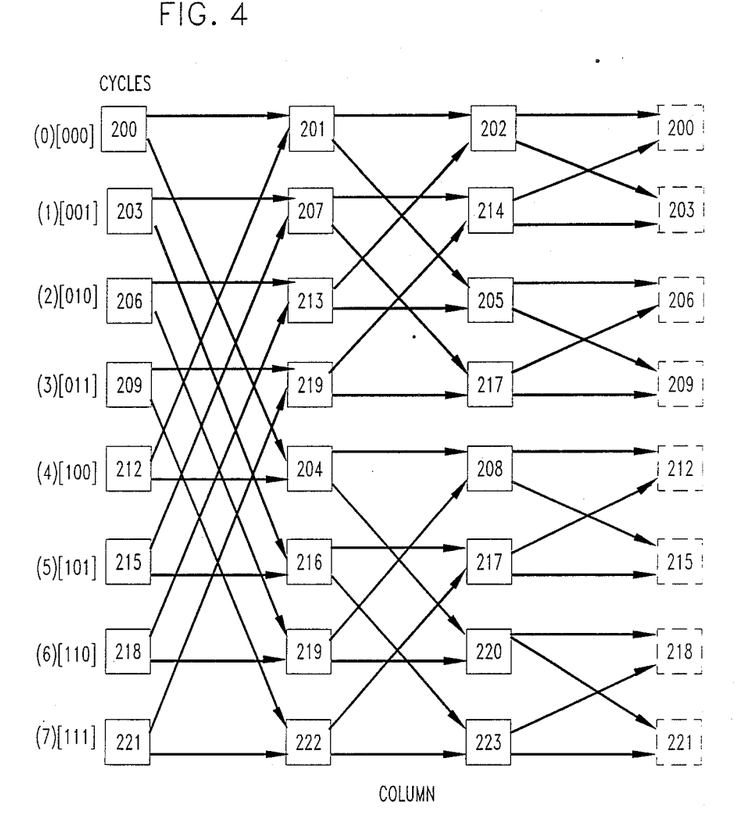
FIG. 4 illustrates the Shufflenet connectivity pattern of FIG. 2, rearranged to show the cycles of the Shufflenet.

FIG. 4 shows the 24 NIU Shufflenet of FIG. 2, the connections between the NIUs of FIG. 4 being identical to those of FIG. 2. The NIUs of FIG. 4 have been arranged so that each cycle makes up a row of NIUs, and the cycles are numbered 0 through 7, from top to bottom, using a binary numbering system. FIG. 4 also shows that an NIU transmits directly only to other NIUs which are either located in the same cycle or are located in a cycle which differs in its binary representation by exactly one digit. For example, NIU 210 is located in cycle 101 of FIG. 4 and transmits directly to NIU 220, located in the same cycle, and to NIU 223, located in cycle 111. The binary numerals 111 and 101 differ only in the middle digit. From FIG. 4 it can also be seen that there are no NIUs in exemplary cycle 101 that transmit directly to any NIUs in exemplary cycle 011, since both the first and the second digits of the numerals 101 and 011 are different. This property is used to derive the special sequence in which to dispose the NIUs for a ring type implementation of the Shufflenet pattern by: (1) disposing the NIUs of each cycle in a prescribed sequence, adjacent to each other, along the ring, and (2) disposing the cycles along the ring in sequence such that every cycle is preceded and followed by a cycle which differs in its binary representation by one bit. Using this physical implementation, the maximum number of channels required to implement a (p,k) Shufflenet on a ring type network is:

$$\left[\frac{p+1}{2}\right]^2 \cdot p^{k-1} - \frac{p+1}{2} + 2 \text{ if } p \text{ odd}$$

$$\frac{p^2(p+3)}{4(p+1)} \cdot p^{k-1} - \frac{p^2}{2(p+1)} \text{ if } p \text{ even and } k \text{ odd}$$

$$\frac{p^2(p+3)}{4(p+1)} \cdot p^{k-1} - \frac{p(p+2)}{2(p+1)} + 2 \text{ if } p \text{ even and } k \text{ even}$$

The above mentioned prescribed sequence is determined as follows: Arrange the NIUs of a cycle in a sequence such that each NIU transmits directly to the next NIU in the sequence, except for the last NIU in the sequence which transmits directly to the first NIU in the sequence. For example, the NIUs of cycle 010 of FIG. 4 could be arranged 213, 205, and 206, since, as FIG. 4 shows, NIU 213 transmits directly to NIU 205, NIU 205 transmits directly to NIU 206, and NIU 206 transmits directly to NIU 213. The sequence of NIUs within any cycle must then be cyclically shifted until a sequence is obtained which requires no more channels within the cycle than the number of channels required between cycles as specified by the above equations. Arranging each cycle of the Shufflenet in a similar manner will result in the NIUs on the ring being disposed in a special sequence which keeps the required number of channels small.

Figure 5:
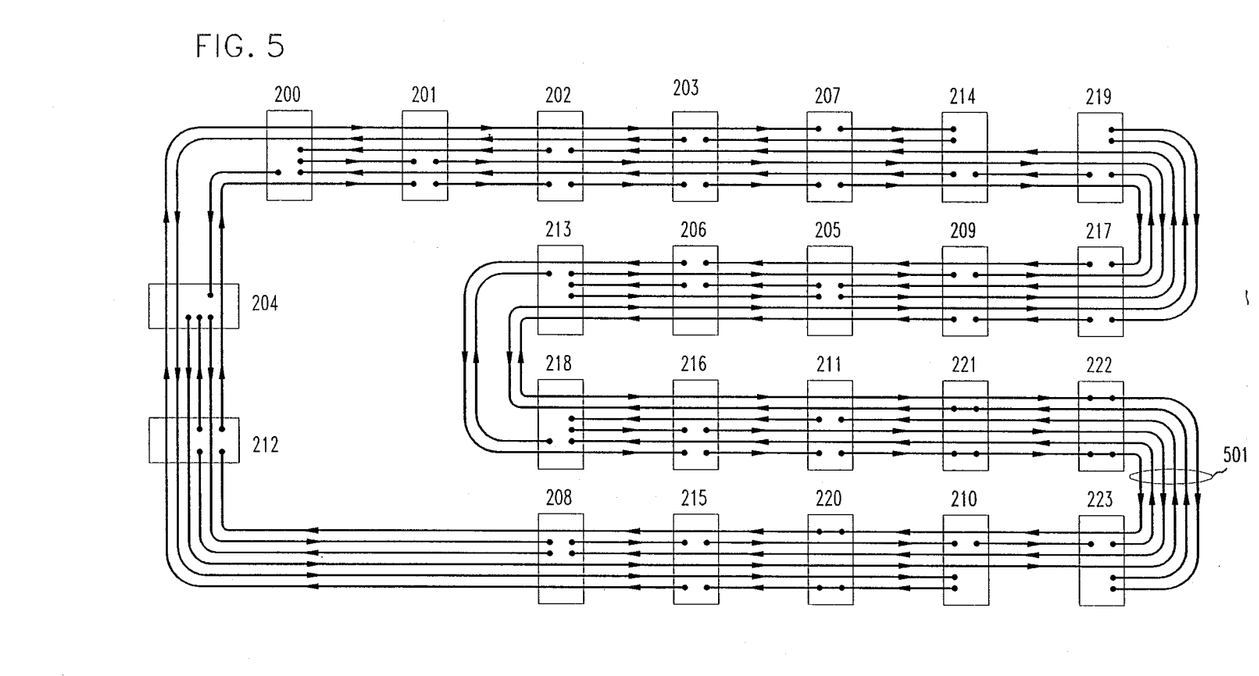
FIG. 5 illustrates a second ring type implementation of the Shufflenet connectivity pattern of FIG. 2 or FIG. 4, wherein the number of channels required on the communications medium is reduced in accordance with the present invention.

FIG. 5 shows the Shufflenet of FIG. 4 implemented on a ring type LAN by using multiple channel communications medium 501 sequentially routed from one NIU to the next. In accordance with an embodiment of the invention, the NIUs in any particular cycle are disposed adjacent to each other along communications medium 501, and the cycles which differ in their binary representations by one digit are also disposed adjacent to each other along communications medium 501.

The network of FIG. 5 exemplifies several important aspects of the invention which allow the required number of channels, as well as the required number of intermediate NIUs which must process each packet, to be kept small. First, with the exception of one NIU in each cycle, each NIU is installed adjacent to the one NIU from the same cycle to which it is configured to transmit directly. Second, for any two cycles which are installed adjacent to each other, at least one NIU from one of the cycles is configured to transmit directly to at least one NIU from the other of the two cycles. Finally, each NIU is able to transmit directly to or receive directly from a plurality of other NIUs which may be located anywhere in the sequence of NIUs but which follow the Shufflenet connectivity pattern of FIGS. 2 and 4. The positions of these other NIUs, to which an NIU is arranged to transmit directly or from which an NIU is arranged to receive directly, relative to the NIU, are different for many of the NIUs in the network. For example, NIU 210 of FIG. 5 transmits directly to NIUs 220 and 223, which are each adjacent on the ring to NIU 210, but receives directly from NIUs 215 and 203, which are separated on the ring from NIU 210 by one and eight NIUs, respectively. NIU 211, on the other hand, transmits directly to NIUs 221 and 218, separated on the ring from NIU 211 by zero and one NIUs, respectively, and receives directly from NIUs 216 and 204, separated on the ring from NIU 211 by zero and eight NIUs, respectively. This nonlinearity of the direct communications links is a result of the logical connection pattern being implemented, and results in a relatively small required number of intermediate hops when compared with prior art ring type networks, which have linear connection patterns.

Figure 6:
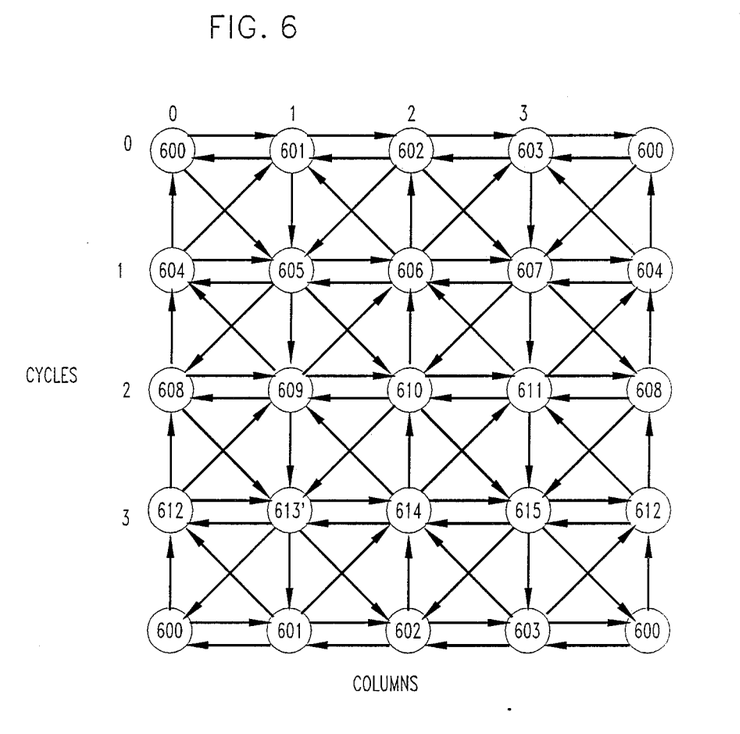
FIG. 6 illustrates an inventive Criss-Cross connectivity pattern which can be implemented using the ring type network of FIG. 1.

In another aspect of the invention, a Criss-Cross connectivity pattern is implemented using the multiple channel communications medium and the ring-type architecture described above. FIG. 6 shows an exemplary Criss-Cross connectivity pattern which can be defined as a plurality of $N^2$ NIUs, where N is an even integer, arranged logically into an $N \times N$ matrix, $4 \times 4$ in this example, with the rows and columns of the matrix being each numbered 0 through $N-1$, and the NIU in the rth row and cth column being designated NIU(r,c). Furthermore, the NIUs are configured to transmit directly to surrounding NIUs according to the following rule:

If r is odd and c is odd: NIU(r,c) transmits directly to NIU(r,c+1), NIU(r,c−1), NIU(r+1,c−1), NIU(r+1,c+1), and NIU(r+1, c)

If r is odd and c is even: NIU(r,c) transmits directly to NIU(r,c+1), NIU(r,c−1), NIU(r−1,c−1), NIU(r−1,c+1), and NIU(r−1,c)

If r is even and c is odd: NIU(r,c) transmits directly to NIU(r,c+1), NIU(r,c−1), NIU(r−1, c−1), NIU(r−1,c+1), and NIU(r+1,c)

If r is even and c is even: NIU(r,c) transmits directly to NIU(r,c+1), NIU(r,c−1), NIU(r+1,c−1), NIU(r+1, c+1), and NIU(r−1, c Addition and subtraction in the above NIU indices are defined Modulo N so that the last row and last column are connected to the first row and first column respectively. Further, it is to be understood that the use of odd and even column numbers is for the purpose of explanation only and that the connection patterns of alternating rows and columns relative to each other, regardless of the numbers they are assigned, is the preferred embodiment. This connectivity pattern is considered efficient for multihop networks because the maximum number of hops required for a packet to reach any destination NIU from any source NIU can be reduced to N/2.

Figure 7:
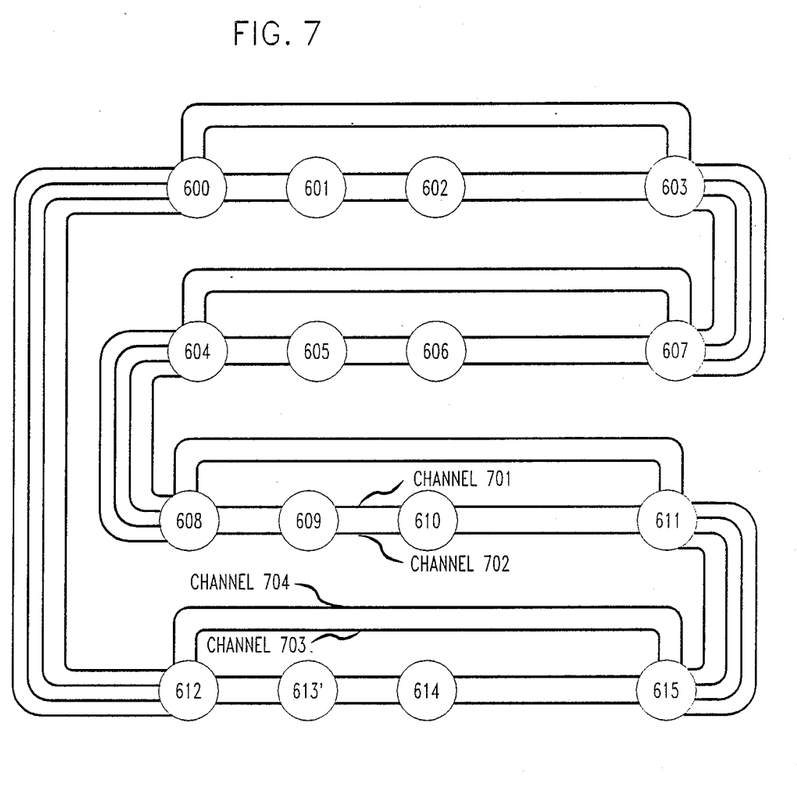
FIG. 7 illustrates the horizontal connections of a ring type implementation of the Criss-Cross connectivity pattern of FIG. 6 in accordance with the present invention, with the NIUs arranged so that several of the channels are reused many times.

FIG. 7 shows only the horizontal connections of the exemplary 4×4 Criss-Cross connectivity pattern shown in FIG. 6. It is to be understood that the bottom row and rightmost column of FIG. 6 is repetitive of the top row and leftmost column, respectively in FIG. 6, and is only shown in FIG. 6 in order to display the logical connectivity pattern. Accordingly, any logical connections to the bottom row and rightmost column of FIG. 6 have been replaced in FIG. 7 by physical connections to the top row and leftmost column of FIG. 7, and the bottom row and rightmost column of FIG. 6 have been eliminated in FIG. 7.

Each of the NIUs in FIG. 7 is inserted serially into two channels 701 and 702 and the NIUs located in the last and first columns of FIG. 7 are also inserted into two additional channels 703 and 704 to establish the wraparound connections. The dashed lines in FIG. 7 represent sections of the four channels 701, 702, 703, and 704 which are not used to interconnect any NIUs but are shown only to more clearly display the ring type structure of the network.

Figure 8:
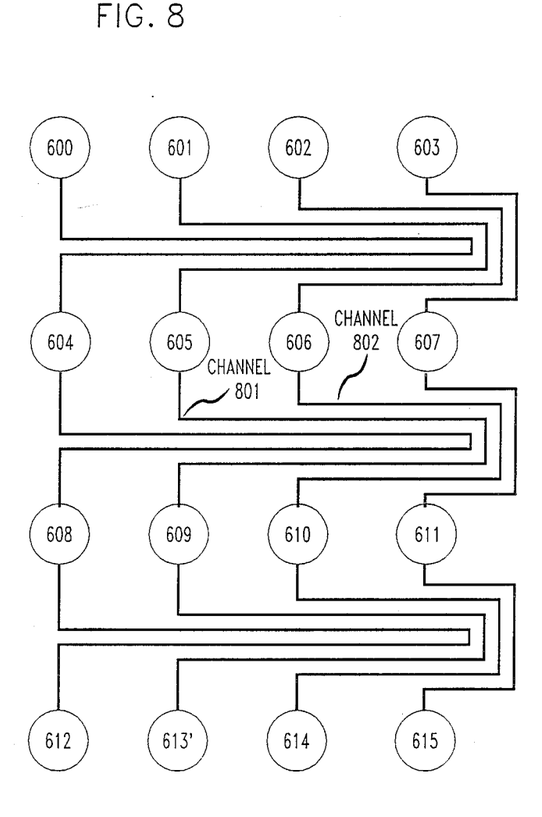
FIG. 8 illustrates the vertical connections required, in addition to the horizontal connections of FIG. 7, for a ring type implementation of the Criss-Cross connectivity pattern of FIG. 6.

FIG. 8 shows the physical connections needed to implement the vertical logical connections of FIG. 6. Each of the channels used to effect these vertical connections is stretched to conform to the path of the multiple channel communications medium. The diagonal connections of FIG. 6 may be implemented via separate channels, in a manner similar to that of the vertical connections shown in FIG. 8, or they may be multiplexed onto the existing channels.

Figure 9:
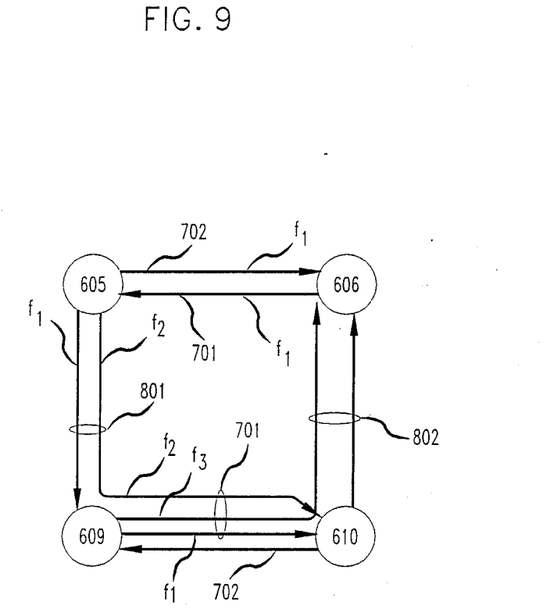
FIG. 9 illustrates the final connections required, in addition to the connections of FIGS. 7 and 8, for a portion of the ring type implementation of the Criss-Cross connectivity pattern of FIG. 6.

FIG. 9 shows an example, using NIUs 605, 606, 609, and 610 of FIG. 6, of how to multiplex the diagonal connections onto the existing channels. In this example, understood to be for illustrative purposes only and not as limiting the scope of the invention, each of the channels is a fiber optic filament capable of supporting a lightwave signal and the multiplexing means used by the NIUs is Frequency Division Multiplexing (FDM). Each filament in FIG. 9 is numbered to correspond to the channel number from FIGS. 7 or 8 which the filament represents. More particularly, NIU 605 transmits data onto filament 801 at two frequencies; f1 for data destined for NIU 609, and f2 for data destined for NIU 610. NIU 609 receives both frequencies, interprets data at f1 as being destined for itself, but relays data at f2 to NIU 610 by means of filament 701. This could be accomplished using, for example, a selective wavelength filter, which filters out f1 but couples f2 from filament 801 to filament 701. Thus the diagonal connection between NIU 605 and NIU 610 is implemented by multiplexing it onto existing filaments 801 and 701. Similarly, NIU 609 transmits data onto filament 701 at two frequencies; f1 for data destined for NIU 610 and f3 for data destined for NIU 606. NIU 610 receives all three frequencies f1, f2, and f3 on filament 701 and interprets data on frequencies f1 and f2 as being destined for itself and as having been transmitted from NIUs 609 and 605, respectively. Transmissions at frequency f3 are forwarded by NIU 610 to NIU 606 by means of filament 802, also using an exemplary selective wavelength filter. NIU 606 receives all the data on filament 802, however frequencies f1 and f3 represent data transmitted from NIUs 610 and 609, respectively. Filament 702 is used to implement the direct transmission paths from NIU 610 to NIU 609, and from NIU 605 to NIU 606, and any of the frequencies is acceptable for use on this filament since no multiplexing is required. Finally, it should be noted that although the section of filament 701 of FIG. 9 which provides direct communications from NIU 606 to NIU 605 is shown in FIG. 9 as carrying only frequency f1, there would actually be three frequencies on this filament because of the diagonal connections between NIUs 606 and 601 and between NIUs 602 and 605, not shown in FIG. 9.

The multiplexing system described above requires that filament 801 carry data on f1 and f2 and that filament 802 carry data on channels f1 and f3. Furthermore, two of the four horizontal filaments 701, 702, 703 and 704 will each have to carry data on three different frequencies. In general, to implement the Criss-Cross connectivity pattern for $N^2$ NIUs on a ring type network would require 3N+4 channels, N for the vertical connections, 4 for the horizontal connections, and 2N for the diagonal connections. Using the multiplexing method described above, the network can be implemented with N+4 channels. The ring implementation of the Criss-Cross connectivity pattern is similar to that of the Shufflenet in that each NIU shares common links, one each, with a plurality of other NIUs and that the positions of the other NIUs with which a first NIU shares a common link, relative to the first NIU, are different from the positions of the other NIUs with which a second NIU shares a common link, relative to the position of the second NIU.

We claim:
1. A communications network comprising:
a communications medium for supporting a plurality of communications channels, each channel comprising at least one communications link and each communication link of a channel located in a different section of the channel; and
a plurality of Network Interface Units (NIUs) disposed along the communications medium in a predetermined sequence such that (1) each NIU is arranged to transmit directly to at least a first other NIU in the network via a separate communication link and to receive directly from at least a second other NIU via a separate communications link, (2) at least one of the plurality of NIUs is arranged not to transmit directly to at least one other NIU of the network, and (3) at least two NIUs of the network are arranged as "express NIUs" which, in addition to being arranged to transmit directly to at least a first other NIU and to receive directly from at least a second other NIU via separate communication links, are each arranged to transmit directly to at least one additional NIU via at least a separate additional link and to receive directly from at least one additional NIU via at least a separate additional link, and a separate number of NIUs are disposed in sequence along the communications medium between each express NIU and each of the other NIUs to which that express NIU is arranged to transmit directly to or receive directly from, the number of NIUs disposed along the medium between at least one of said express NIUs and at least one other NIU to which said express NIU is arranged to transmit directly or from which said express NIU is arranged to receive directly being different from the number of NIUs disposed along the communications medium between at least one other express NIU and any other NIU to which the other express NIU is configured to directly transmit or from which the other NIU is configured to directly receive.

2. A communications network according to claim 1 wherein the plurality of NIUs are connected by separate communications links in accordance with a (p,k) Shufflenet connectivity pattern, where p is the number of transmitters or receivers included in each NIU and k is the number of columns of the interconnection pattern.

3. A communications network according to claim 2 wherein predetermined NIUs, one from each of the k columns of the Shufflenet connectivity pattern, are arranged to transmit in a predetermined cycle from a first NIU through k−2 other NIUs to a last NIU which is arranged to transmit to the first NIU, and each NIU of the predetermined cycle except the last NIU of the predetermined cycle is arranged to transmit directly to an NIU of the cycle which is disposed adjacent to the NIU.

4. A communications network according to claim 3 wherein each of the plurality of NIUs is associated with a cycle.

5. A communications network according to claim 4 wherein when an NIU of a first set of k NIUs is disposed adjacent to an NIU of a second set of k NIUs, at least one of the NIUs of the first set is arranged to transmit directly to at least one of the NIUs of the second set.

6. A communications network according to claim 1 wherein the plurality of NIUs are interconnected by the communications links in a Criss-Cross connectivity pattern.

7. A communications network according to claims 1, 2, 3, 4, 5 or 6 wherein at least two of the communications channels are Frequency Division Multiplexed (FDM) onto a physical common portion of the communications medium.

8. A communications network according to claim 1, 2, 3, 4, 5, or 6 wherein the communications network is in the form of a ring network.

9. A communications network according to claim 8 wherein at least two of the channels are Frequency Division Multiplexed onto a physical common portion of the medium.

* * * * *